United States Patent [19]
Beck

[11] 3,877,514
[45] Apr. 15, 1975

[54] HEAT EXCHANGER VALVE SYSTEM

[75] Inventor: Theodore A. Beck, Riverside, Calif.

[73] Assignee: Hayden Trans-Cooler, Inc., Corona, Calif.

[22] Filed: June 19, 1972

[21] Appl. No.: 263,930

[52] U.S. Cl. .................. 165/38; 60/329; 137/493; 138/38; 138/45; 165/103; 251/75
[51] Int. Cl. ........................................ F28f 27/02
[58] Field of Search............ 137/493, 493.8, 493.9, 137/525.3, 539; 165/35, 38, 103, 179; 251/75; 138/45, 46, 38; 60/329, 337

[56] References Cited
UNITED STATES PATENTS

| | | | |
|---|---|---|---|
| 2,593,315 | 4/1952 | Kraft | 138/45 |
| 2,943,845 | 7/1960 | Jaklitsch | 165/38 |
| 2,968,314 | 1/1961 | Whitworth | 137/493.9 |
| 3,092,137 | 6/1963 | Thieme et al. | 137/493 |
| 3,151,626 | 10/1964 | Everett | 137/493 |
| 3,245,428 | 4/1966 | Klimak et al. | 137/493 |
| 3,251,376 | 5/1966 | Worden | 137/493 X |
| 3,315,464 | 4/1967 | Hayden | 60/329 |
| 3,394,736 | 7/1968 | Pearson | 138/38 |
| 3,566,902 | 3/1971 | Muller | 138/45 X |
| 3,628,565 | 12/1971 | McWethy et al. | 137/525.3 |
| R20,835 | 8/1938 | Spencer | 251/75 X |

FOREIGN PATENTS OR APPLICATIONS

| | | | |
|---|---|---|---|
| 17,909 | 8/1902 | United Kingdom | 138/38 |
| 589,815 | 9/1945 | United Kingdom | 137/493 |
| 966,137 | 8/1964 | United Kingdom | 137/493 |

Primary Examiner—Albert W. Davis, Jr.
Assistant Examiner—Sheldon Richter
Attorney, Agent, or Firm—Albert L. Gabriel

[57] ABSTRACT

The present invention relates generally to heat exchangers, and in particular to a valve system for routing and proportioning the fluid flow through one or more flow paths in heat exchange apparatus according to pressure differential in the apparatus as determined by such factors as fluid temperatures and hence viscosity, and fluid flow rate from the source. Heat exchange apparatus conventionally embodies one or more tubular heat exchange units each having a peripheral array of heat transfer fins defining the fluid flow channels, with a hollow core that is normally closed off against fluid flow. According to the present invention, valve means is disposed within such hollow core and arranged to allow passage therethrough of a portion of the fluid that would normally be required to pass through the peripheral channels, to allow an overall increase in fluid flow with improved heat exchange performance when a large fluid flow volume is available, to accommodate increased fluid viscosity resulting from low temperatures and thereby providing a thermostatic control by diverting a portion of the fluid to a channel of reduced heat exchange effectiveness, and generally increasing the flexibility of the system. Also disclosed herein is a novel spring diaphragm valve element which has particular utility in controlling the fluid flow through such heat exchanger core, but which has general application in the control of fluid flow through a passage.

10 Claims, 8 Drawing Figures

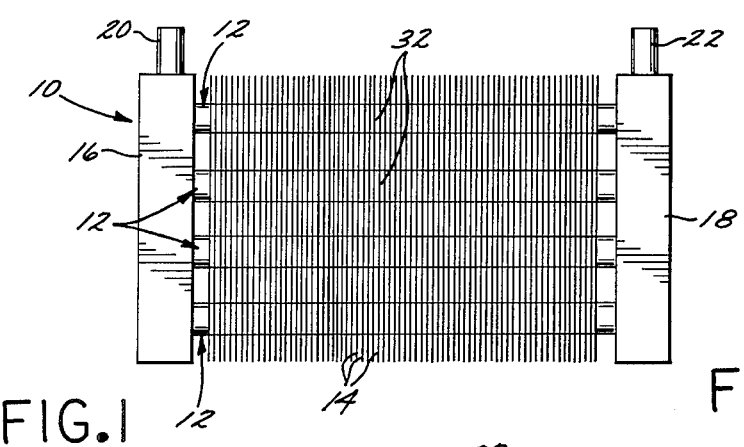
FIG.1
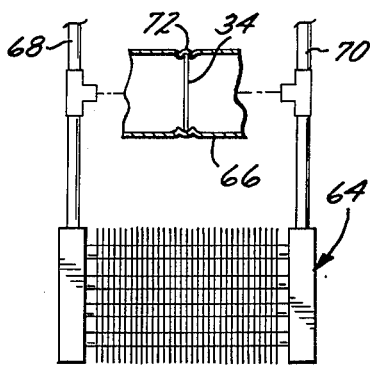
FIG.8
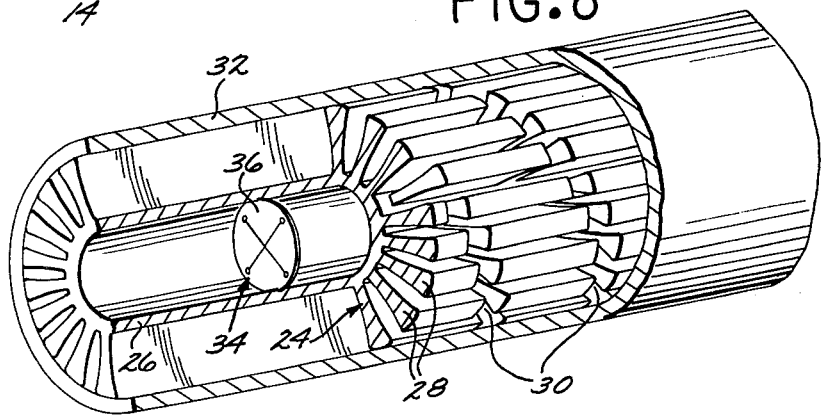
FIG.2
FIG.3 FIG.4
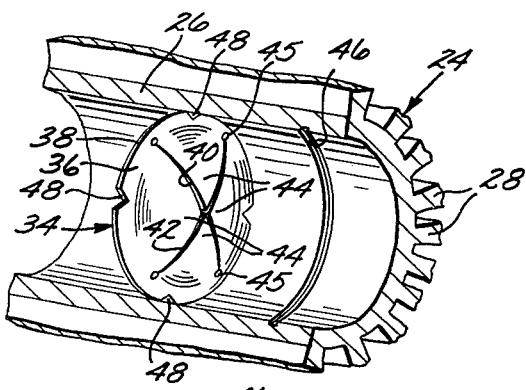
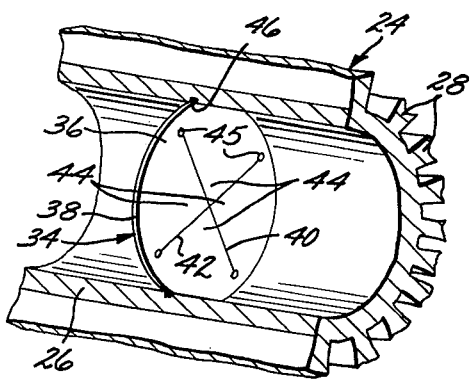
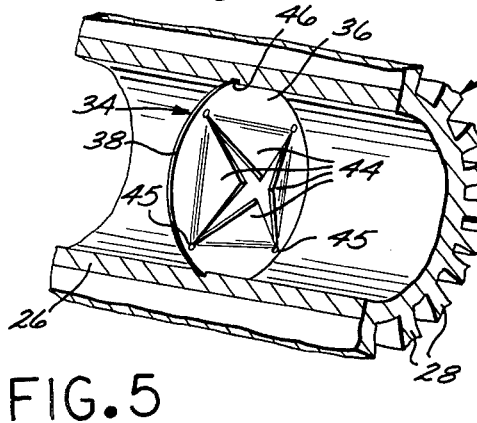
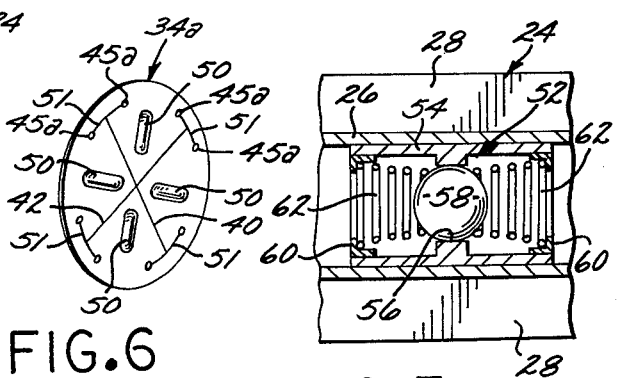
FIG.5 FIG.6 FIG.7

HEAT EXCHANGER VALVE SYSTEM

BACKGROUND OF THE INVENTION

Heat exchangers are currently widely used for cooling the oils employed in connection with the operation of motor vehicles, such as transmission fluid used in automatic transmissions and torque converters, engine oil, power steering fluid, hydraulic fluids, and the like, such oils hereinafter being referred to simply as motor vehicle oils. Such heat exchangers generally embody one or more tubular heat exchange units each having a peripheral array of heat transfer fins defining generally peripherally located fluid flow channels, with a hollow core remaining that is normally closed off against fluid flow. Such a conventional tubular heat exchange unit is illustrated in U.S. Pat. No. 3,315,464, issued Apr. 25, 1967 to Perez M. Hayden for "Heat-Exchange System," as best illustrated in FIG. 3 thereof. The hollow core of such conventional tubular heat exchange units is normally closed off against fluid flow so that all of the fluid will pass through the generally peripherally located channels for more efficient heat exchange to the tubular outer shell.

However, in very cold weather conditions motor vehicle oils become very viscous, and it is desirable to allow them to heat up as quickly as possible. It has accordingly been conventional practice to bypass the heat exchange apparatus during a cold start interval until the oil gets hot, and then to route the oil through the heat exchange apparatus. Such conventional practice involves an additional valve and lines separate from the heat exchange apparatus, and has the major disadvantage of leaving the heat exchange apparatus and the oil that is contained therein at the cold starting temperature. Thus, when the transmission or engine oil is hot and the bypass line is closed to divert the oil through the heat exchange apparatus, the heat exchange apparatus cools the oil. Also, it takes time for the heat exchange apparatus to become effective, since the apparatus and its contents must become heated.

Another problem in connection with such conventional heat exchange units is that the peripheral fluid flow passages have only limited flow capacity, and if larger fluid flow rates are available they cannot be utilized in the conventional structure which has a closed central core.

Another problem in connection with such conventional heat exchange apparatus is that generally there is no pressure drop control means forming a part of the heat exchange apparatus, while nevertheless it is often desirable to control the pressure drop across the heat exchange apparatus, and it is also desireable to be able to adapt what is substantially the same heat exchange apparatus for different specific pressure drops to accommodate different vehicle operating conditions, different vehicle engine or transmission systems, or even different industry requirements of heat exchangers.

A further problem in the art is that fluid flow valves per se tend to be undesirably complicated and expensive, conventionally consisting of a number of separately fabricated parts that must be assembled, such as valve bodies, seats, springs, spring retainers, separate rigid movable valve elements, and the like. Despite such variety of parts which must be assembled, most fluid flow valves only allow flow in one direction. It would accordingly be desirable to provide a simplified low cost fluid flow valve consisting essentially of only a single element that is mountable in a fluid flow channel for controlling the flow of fluid through the channel in either direction.

SUMMARY OF THE INVENTION

In view of these and other problems in the art, it is an object of the present invention to provide a heat exchange valve system for heat exchange apparatus of the type embodying one or more tubular heat exchange units having generally peripherally arranged fluid channels and a hollow core, wherein pressure responsive valve means is disposed in said hollow core and arranged to allow passage therethrough of a portion of the fluid applied to the heat exchange unit.

Another object of the invention is to provide a heat exchange valve system of the character described wherein said valve means is normally closed, and is arranged to commence opening when a predetermined fluid pressure differential is applied to the heat exchange unit, the valve means progressively opening further in response to increases in the pressure differential to allow an increased proportion of the fluid flow to pass through the hollow core.

Another object of the invention is to provide a heat exchange valve system of the character described which directs normal flow volumes through the peripherally located flow channels for maximum heat exchange efficiency, but which opens up to allow excess fluid volumes to flow through the normally closed central core of the heat exchange unit to provide additional heat exchange capacity not available through the restricted peripheral flow channels, thereby increasing the overall heat exchange capacity of the system. In this connection, the valve system of the present invention is adaptable to maintain a generally constant, optimum fluid flow through the peripheral flow channels even if the fluid pressure to the heat exchanger falls to a low value, while nevertheless obtaining additional heat exchange benefit that is normally lost from above normal fluid flows.

Another object of the invention is to provide a heat exchange valve system of the character described wherein the valve means employed has a positive snap action so as to remain closed up to a certain predetermined minimum pressure differential, and then pops open to allow substantial fluid flow at such predetermined pressure differential and then continues to further open as the pressure differential increases.

A further object of the invention is to provide a heat exchange valve system of the character described wherein valve means directly embodied in the heat exchange apparatus opens in response to increased fluid viscosity resulting from low temperatures to divert a portion of the fluid to a channel of reduced heat exchange effectiveness to allow heating of the fluid, the valve means returning flow back to the fluid flow channels of high heat exchange capacity for improved fluid cooling when the fluid becomes hot, in a thermostatic type of action.

A still further object of the invention is to provide a novel fluid flow control valve comprising a one-piece spring diaphragm valve element adapted to be disposed across a fluid flow channel and capable of controlling the flow of fluid in either direction through the channel. In its preferred form, this spring diaphragm valve element is normally closed and will open in either direction a varying amount according to the fluid pressure differential applied across the valve element. In one form of the valve element "cricket" depressions provide a snap valve action wherein the valve remains closed up to the application of a predetermined pressure differential, and then "snaps" partly open to admit a substantial flow of fluid therethrough, the valve opening progressively further in response to progressive increases in fluid pressure differential across the valve element.

The present heat exchange valve system preserves the advantages of the normally closed inner tube of tubular heat exchange units that are conventionally employed in motor vehicle transmission and engine oil coolers, while nevertheless providing substantially increased cooling capacity by opening the inner tube to additional fluid flow which could not otherwise be utilized for heat exchange purposes. By proper selection of the valve embodied in the inner tube according to the present invention, a generally preselected pressure drop can be provided in the heat exchanger which is best adapted for a particular heat exchange purpose.

The present invention has particular importance in permitting the complete elimination of external valves and bypass lines heretofore required for diverting transmission and engine oils from heat exchangers during cold start conditions. Diversion of cold, highly viscous motor vehicle oil from the normal heat exchange channels through the inner tubes is automatic because the resistance of the normal channels to flow of the highly viscous fluid increases the pressure differential so as to open the valve means in the inner tube. This causes reduced cooling efficiency so as to allow the oil to heat up, and the warming oil passing through the centers of the heat exchanger tubes causes the heat exchanger to warm up as the oil warms up, so that it will not cool the oil when the fluid is again diverted primarily through the normal heat exchange channels.

As the oil heats up from a cold start condition, the viscosity will become lower and lower, and hence the pressure differential will gradually decrease across the heat exchanger, to allow the valve means in the inner tubes to automatically close and divert the fluid through the normal heat exchange channels which is where the fluid will be flowing when the oil is hot.

The heat exchange valve system of the present invention can be adjusted to operate thermostatically during normal vehicle operating conditions by providing a heat exchanger of sufficient capacity to handle all of the oil flow in the peripheral heat exchange channels when the oil temperature is at or above the optimum operating temperature thereof. The valve means of the present invention is selected to commence opening when the oil temperature drops below such optimum temperature, thereby bypassing some of the oil flow through the less effective inner tube portions of the heat exchanger, thereby reducing the effective capacity of the heat exchanger so that the temperature of the oil will again tend to rise. This thermostatic action will automatically take care of the low temperature starting problem, and at very low temperatures the valve means will bypass most of the fluid.

Even in a heat exchange system of the type having an external bypass line and associated valve means for diverting fluid from a heat exchanger in response to excessive pressure, as for example during cold start conditions, the novel one-piece spring diaphragm valve element of the present invention is particularly advantageous for controlling the bypass flow because it is more simple, reliable and economical than conventional valves used for such purpose, and it can be easily installed in the bypass line by a simple crimping operation thereby avoiding the need for special fittings.

Other objects, aspects and advantages of the present invention will be apparent from the following description taken in connection with the accompanying drawings, wherein:

BRIEF DESCRIPTION OF THE DRAWINGS

FIG. 1 is an elevational view illustrating heat exchange apparatus of one type which is particularly suitable for use with the present invention.

FIG. 2 is an enlarged, fragmentary isometric view illustrating one of the tubular heat exchange units in the apparatus of FIG. 1 embodying valve means according to the present invention, FIG. 2 having a portion of the outer shell broken away, and being partly in axial section and partly in radial section.

FIG. 3 is a further enlarged, fragmentary isometric view, partly in axial section, illustrating the installation of valve means according to the invention.

FIG. 4 is a view similar to FIG. 3, but illustrating the valve means in its fully installed position.

FIG. 5 is a view similar to FIGS. 3 and 4, illustrating the valve means in a partially opened condition of operation.

FIG. 6 is an isometric view illustrating a modified form of the valve means.

FIG. 7 is a fragmentary axial section, partly in elevation, illustrating alternative valve means which may be employed in the heat exchange apparatus.

FIG. 8 diagrammatically illustrates a bypass line associated with heat exchange apparatus, FIG. 8 having portions in elevation and portions in axial section showing a crimped mounting of the valve element of the invention in the bypass line.

DETAILED DESCRIPTION

FIG. 1 illustrates heat exchange apparatus 10 of a general type that is currently widely employed in heat exchange systems for cooling the motor vehicle oils. Such heat exchange systems employing heat exchange apparatus of the general type shown in FIG. 1 are described in U.S. Pat. No. 3,315,464, issued Apr. 25, 1967 to Perez M. Hayden, for "Heat-Exchange System."

The heat exchange apparatus 10 represents one form of apparatus in which both the valve system and the presently preferred valve element of the present invention may be embodied, although it is to be understood that the valve system of the invention may be employed in other types of heat exchange apparatus, particularly wherein it is desirable to bypass some of the fluid from primary heat transfer elements according to temperature variations in the fluid as represented by corresponding viscosity variations; and it is to be understood that the preferred valve element of the present invention may be employed for fluid flow control in fluid systems other than heat exchange systems.

Nevertheless, the present heat exchange valve system and preferred valve element find particular utility in heat exchange apparatus that is employed for cooling of motor vehicle oils, because of the widely varying ambient temperature conditions to which vehicles are ordinarily subjected, as well as because of the wide variations in transmission and engine operating fluid temperatures which result from work load variations.

The heat exchange apparatus 10 of FIG. 1 includes a plurality of tubular heat exchange units 12, any one or more of which may contain valve means according to the present invention. Four of these tubular heat exchange units 12 are shown in the apparatus 10 of FIG. 1, these being arranged in a generally parallel, regularly spaced planar array. The tubular heat exchange units 12 are engaged through spaced apertures in a series of parallel fins 14 that are disposed generally normal to the axes of the tubular heat exchange units 12. The fins 14 provide support for the array of tubular heat exchange units 12, and they are in heat exchange relationship with the outer surfaces of the tubular units 12 so as to add considerable additional heat exchange area to the apparatus. The opposite ends of heat exchange units 12 are connected for fluid flow to respective headers 16 and 18, the headers having respective fluid line connector fittings 20 and 22 thereon. The heat exchange apparatus 10 accordingly embodies a parallel flow arrangement of the plurality of tubular heat exchange units 12. It is to be understood, however, that the present heat exchange valve system is equally adaptable for a series flow arrangement of a plurality of tubular heat exchange units, such as the series arrangement shown and described in the applicant's concurrently filed U.S. patent application for "Heat Exchange Apparatus and Method of Making Same," Ser. No. 263,931.

Referring now particularly to FIG. 2 of the drawings, each of the tubular heat exchange units 12 includes an elongated flow control core 24 consisting of a tubular core body 26 having thereon a plurality of regularly spaced, generally radially outwardly extending core fins or splines 28. The flow control core 24 is of a form shown and described in detail in the applicant's said concurrently filed application for "Heat Exchange Apparatus and Method of Making Same," including outwardly flaring core fins having concave sides, and the fins being longitudinally segmented by a spiral groove 30. The flow control core 24 is fitted within an elongated tubular outer shell 32, the core 24 preferably being expanded outwardly into a prestressed relationship with the tubular outer shell 32. The core 24 is preferably an extrusion, and core 24 and outer shell 32 are both preferably composed of a good heat conducting metal, such as aluminum, copper, or the like.

FIGS. 2 through 5 illustrate the operative disposition of a spring diaphragm valve element 34 according to the invention in association with one of the tubular heat exchange units 12 so as to control the flow of liquid through the tubular core body 25 according to fluid viscosity, which in turn is dependent upon fluid temperature.

The spring diaphragm valve element 34 consists of a disc 36 of sheet spring material having a generally annular periphery 38 and a pair of diametrical slits 40 and 42 therethrough at right angles to each other. Thus, the slits 40 and 42 define a right angle X that is centered proximate the center of the disc 36. The slits 40 and 42 terminate short of the periphery 38 of disc 36 so as to leave a peripheral body of disc 38 structurally intact. The diametrical slits 40 and 42 define four quadrant-shaped valve flaps or leaves 44 of substantially equal size and configuration. Small drilled holes 45 are provided at the ends of slits 40 and 42 to prevent tearing of the sheet spring material as the flaps or leaves 44 flex during operation of valve element 34.

While the spring diaphragm valve element 34 as shown in the drawings thus has four spring flaps 44 defined by a pair of right-angle related diametrical slits 40 and 42, it is to be understood that any number of generally wedge-shaped flaps may be provided by a corresponding number of generally radially oriented slits in the disc 36. Thus, if desired, three wedge-shaped flaps may be provided between three radial grooves, four flaps may be provided between four radial grooves, which may be diametrical as illustrated in FIGS. 2 to 5, five flaps may be provided between five radial grooves, six flaps between six radial grooves, etc., all within the scope of the invention. It is also to be understood that the wedges need not all be of the same angular size; and that flaps of other shapes may be provided by other configurations of intersecting slits.

The thickness of the sheet spring material of disc 36, as well as the type of spring material thereof, will be determined by the diameter of the disc, the temperature range in which the heat exchange apparatus will be used, and the fluid pressures and viscosities contemplated. By way of example only, and not of limitation, in automative heat exchange apparatus with tubular heat exchange units 12 of such dimension as to utilize discs 36 that are five-sixteenth inch in diameter, suitable sheet spring material employed in testing was spring steel shim stock of approximately 0.002 inch thickness.

If the tubular core body 26 is uninterrupted by any passages through the wall thereof, then normally a single one of the spring diaphragm valve elements 34 will be sufficient to control the flow of fluid through the tubular core body 26. An internal annular groove 46 is provided in the core body 26 adjacent to one end thereof to receive the periphery of disc 38 therein and thereby retain the valve element 34 operatively positioned across the flow passage in the tubular core body 26. The periphery of the disc 36 may be provided with a plurality of externally opening notches 48 that are preferably circumferentially offset from the slits 40 and 42, to facilitate insertion of the valve element 34 through the bore of core body 26 and into engagement with the internal annular groove 46. Insertion is accomplished by simply pushing the valve element 34 into the core body 26 by a suitable arbor or rod, the valve element 34 bowing and slightly radially contracting generally as illustrated in FIG. 3, and then snapping into operative position in the annular groove 46 as illustrated in FIG. 4.

When the valve element 34 is thus operatively positioned within the core body 26, it will open in response to fluid pressure in either direction, whereby the direction of fluid flow generally need not be specified for heat exchange apparatus such as the apparatus 10 embodying the present invention. FIG. 5 illustrates the valve element 34 partially opened in response to fluid pressure from the left, thereby permitting fluid flow therethrough from left to right according to the viscosity of fluid and the pressure drop across the valve element 34.

While a single one of the valve elements 34 will normally suffice for each of the tubular heat exchange units 12, it is to be understood that if additional control is desired, a plurality of the valve elements 34 may be disposed in the tubular core body 26 of one of the heat exchange units 12, for example, one of the valve elements 34 being located adjacent to each end of the core body 26. Such plurality of valve elements 34 in a core 24 is desirable if the core body 26 has one or more radial openings therethrough to provide communication between the interior of the core body 26 and the exterior thereof in the flow channels between the fins 28.

While normally there will be at least one of the valve elements 34 disposed in the core body of each of the tubular heat exchange units 12 of a heat exchange apparatus such as the apparatus 10 so as to control the fluid flow through the core bodies of all of the tubular heat exchange units 12; if desired the valve elements 34 may be disposed in only a portion of the tubular heat exchange units for a particular heat exchange apparatus such as the apparatus 10 in FIG. 1. For example, if desired, valve elements 34 may be disposed in the core body 26 of say only one, two, or three out of four heat exchange units 12 forming a part of the apparatus 10 in FIG. 1. The ends of the tubular heat exchange units are generally open as illustrated in FIG. 2 to communication with the respective headers 16 and 18. The normal flow through those tubular heat exchange units 12 having valve elements 34 therein will be through the flow channels defined between the fins 28 outside of the core body 26, with flow through the core bodies 26 normally being completely blocked by the valve elements 34, which are normally in their closed positions as shown in FIG. 2 and 4. However, when the pressure differential between the headers 16 and 18 becomes greater than a predetermined minimum pressure differential, usually as a result of increased fluid viscosity because of low temperature, the valve elements 34 will start to open as indicated in FIG. 5, and they will open greater amounts for greater pressure drops, thereby increasing the flow through the core body 26 as required to give relief for increaed viscosities or volumes. In those heat exchange units 12 which do not have a valve element 34, the flow will be partially through the channels between fins 28 and partially through the center of core body 26.

For some uses of the spring diaphragm valve element 34 it is desirable to have a definite predetermined pressure drop across the valve element required to initiate fluid flow through the valve element, and then for the initial fluid flow to be substantial. FIG. 6 illustrates a modified form 34a of the spring diaphragm valve element wherein each of the spring flaps 44 thereof has a generally radially oriented, elongated "cricket" type depression 50 therein. These depressions 50 resist slight initial opening movements of the flaps 44 to allow pressure buildup to the predetermined minimum, and then snap open at the predetermined pressure to an initial fluid flow capacity, further opening of the flaps 44 being in gradual response to increases in the fluid pressure.

Another alternative feature which may be employed in the spring diaphragm type valve element of the present invention which is shown for convenience in FIG. 6, but may be employed in the valve elements with or without the "cricket" depressions, is the provision of flap root slits 51 provided proximate the ends of the slits 40 and 42 and generally transverse to the slits 40 and 42 so as to decrease the effective widths of the root portions of the flaps to allow easier bending of the flaps under fluid pressures. Each of these flap root slits 51 preferably extends an equal distance on opposite sides of its respective slit 40 or 42, terminating in small drilled holes 45a to prevent tearing, and the slits 51 may either be arcuate as illustrated in FIG. 6, with an arc generally concentric to the periphery of the disc, or may be straight or otherwise configured.

FIG. 7 illustrates an alternative flow control valve generally designated 52 which may be employed to control fluid flow through one of the tubular core bodies 26 in response to pressure differential. The valve 52 includes a tubular valve body 54 in the form of a sleeve adapted to be fixedly positioned within a tubular core body 26. The sleeve 54 has a central inwardly directed annular flange defining a valve seat 56 within which a valve element 58 is normally disposed as shown so as to substantially completely block the flow of fluid through the core body 26. The valve element 58 is shown as a ball, but may be a flanged pin or other generally rigid element which will normally substantially close the valve when positioned proximate the valve seat, but open the valve to allow fluid flow when axially shifted either way from the valve seat.

The valve element 58 is retained in its normal centered position in valve seat 56 by a pair of centering springs 62 which are engaged between the valve element 58 and respective spring retainer collars 60 disposed proximate the respective ends of the valve body sleeve 54. The amount of pressure differential required to shift the valve element 58 out of registry with valve seat 56 to allow fluid flow in either direction will be determined by the forces exerted by the centering springs 62 and by the axial length of the valve seat 56 and cross-sectional area thereof.

FIG. 8 illustrates heat exchange apparatus generally designated 64 protected against excessive fluid pressures by means of a bypass line 66 having a spring diaphragm element 34 of the present invention mounted directly therein. The bypass line 66 is connected across the fluid inlet and outlet conduits 68 and 70 in parallel with the heat exchange apparatus 64, and the valve element 34 is adapted to open and thereby divert a portion of the fluid flow from the heat exchange apparatus 64 in response to a rise in the pressure differential between inlet and outlet conduits 68 and 70 above a predetermined value. FIG. 8 illustrates the manner in which the disc-shaped valve element 34 may be positively mounted in its operative position within a tube such as the bypass line 66 by means of a crimp 72 in the tube. The valve element 34 is simply positioned within the tube with the plane of the valve element generally normal to the axis of the tube, and then the tube is crimped inwardly against the valve element disc. The crimp 72 is preferably annular, but may consist of a plurality of circumferentially spaced crimp sections if desired. The crimp 72 preferably radially inwardly overlaps the edge of the valve element 34 as shown in FIG. 8 so as to positively secure the valve element against substantial pressure applied in either direction.

While the instant invention has been shown and described herein in what are conceived to be the most practical and preferred embodiments, it is recognized that departures may be made therefrom within the scope of the invention.

I claim:

1. Heat exchange unit which comprises an elongated central tubular core, a plurality of elongated generally longitudinally arranged, circumferentially spaced heat transfer fins extending generally radially outwardly from said core, both sides of each of said fins being concavely curved in the general radial direction throughout substantially their entire radial width with their outer edges being thicker than inner portions thereof and an elongated, tubular shell peripherally engaged about and in heat conducting abutting relationship with the outer edges of said fins, said core, fins and shell defining a plurality of fluid flow channels between adjacent pairs of the fins, said central tubular core defining bypass flow conduit means extending generally longitudinally therethrough, with the ends of said channel means being in fluid communication with the respective ends of said conduit means, and bypass valve means in said conduit means, said channel means being adapted to conduct heat transfer fluid in normal heat exchange flow through said unit, and said valve means having at least one operative condition wherein it is adapted to bypass a portion of said fluid from said channel means through said conduit means.

2. Heat exchange apparatus as defined in claim 1, wherein said bypass valve means has a normally substantially closed operative condition wherein substantially all of said fluid flowing through the unit flows in normal heat exchange flow through said channel means.

3. Heat exchange apparatus as defined in claim 2, wherein said bypass valve means is ambi-directional, being adapted to open either way from its said closed operative condition to allow said fluid to flow in either direction through said bypass conduit means, whereby said heat exchange unit is adapted to be connected in a heat exchange system without regard to the direction of fluid flow therethrough.

4. Heat exchange apparatus as defined in claim 1, wherein said bypass valve means is pressure responsive.

5. Heat exchange apparatus as defined in claim 1, wherein said fluid channel means has better heat transfer characteristics than said bypass conduit means, and said bypass valve means is temperature responsive to generally open increased amounts to reduce overall heat transfer from the fluid in response to reduced fluid temperatures, whereby said valve means provides generally thermostatic fluid temperature control in use of said heat exchange apparatus for fluid cooling.

6. Heat exchange apparatus as defined in claim 1, wherein said bypass valve means is normally substantially closed and is pressure responsive to progressively open in response to progressive pressure increases.

7. Heat exchange apparatus as defined in claim 1, wherein said bypass valve means is normally substantially closed and has a snap-action pressure responsive opening characteristic wherein said valve means is adapted to snap open to allow substantial fluid flow when the pressure on the valve means rises above substantially a predetermined value.

8. Heat exchange apparatus as defined in claim 1, wherein said valve means comprises a spring sheet diaphragm having slit means therein defining resiliently deflectable pressure responsive flap means in the diaphragm.

9. Heat exchange apparatus as defined in claim 8, wherein said diaphragm is mounted in said bypass flow conduit means by peripheral engagement thereof in internal groove means in said hollow core.

10. Heat exchange apparatus as defined in claim 1, which comprises a plurality of said tubular heat exchange units operatively interconnected, said plurality of units being arranged to have common fluid inlet means and common fluid outlet means.

* * * * *